United States Patent
Quinn et al.

(10) Patent No.: US 11,162,744 B2
(45) Date of Patent: Nov. 2, 2021

(54) HEAT SINK PHASE CHANGE MATERIAL

(71) Applicant: HAMILTON SUNDSTRAND CORPORATION, Charlotte, NC (US)

(72) Inventors: Gregory John Quinn, Windsor, CT (US); Daniel J Kehoe, Ellington, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 372 days.

(21) Appl. No.: 15/864,936

(22) Filed: Jan. 8, 2018

(65) Prior Publication Data
US 2019/0212080 A1 Jul. 11, 2019

(51) Int. Cl.
| C09K 5/00 | (2006.01) |
| F28F 19/00 | (2006.01) |
| C09K 5/06 | (2006.01) |
| F28D 20/02 | (2006.01) |

(52) U.S. Cl.
CPC .............. *F28F 19/00* (2013.01); *C09K 5/063* (2013.01); *F28D 20/021* (2013.01); *F28F 2265/12* (2013.01)

(58) Field of Classification Search
CPC ............................... C09K 5/063; F28D 20/021
See application file for complete search history.

(56) References Cited

U.S. PATENT DOCUMENTS

| 5,945,217 | A | 8/1999 | Hanrahan |
| 6,783,692 | B2 | 8/2004 | Bhagwagar |
| 7,320,770 | B2 | 1/2008 | Chomard et al. |
| 7,505,269 | B1* | 3/2009 | Cosley ............... F28D 15/02 361/700 |
| 9,545,365 | B2 | 1/2017 | Seidling et al. |
| 9,663,605 | B2 | 5/2017 | Adam |
| 9,784,509 | B2 | 10/2017 | Al-Hallaj et al. |
| 2005/0281979 | A1* | 12/2005 | Toas ..................... E04B 1/00 428/113 |
| 2009/0199994 | A1* | 8/2009 | Amano ............... F28D 20/023 165/10 |
| 2012/0196040 | A1* | 8/2012 | Wilk, Jr. ............. F28D 20/023 427/294 |
| 2016/0168439 | A1* | 6/2016 | Ayambem ............ D21H 19/20 428/402 |
| 2016/0212878 | A1 | 7/2016 | Quinn |
| 2016/0304761 | A1 | 10/2016 | Sjong |
| 2016/0324171 | A1 | 11/2016 | Rothfuss et al. |
| 2019/0085225 | A1* | 3/2019 | Zhang ................ H01L 23/3737 |

FOREIGN PATENT DOCUMENTS

CN            104371665    *   2/2015

OTHER PUBLICATIONS

Zalba, Belen et al., "Review on Thermal Energy Storage with Phase Change: Materials, Heat Transfer Analysis and Applications", Applied Thermal Engineering vol. 23, (2003), pp. 251-283, Elsevier Science Ltd.

* cited by examiner

*Primary Examiner* — Necholus Ogden, Jr.
(74) *Attorney, Agent, or Firm* — Snell & Wilmer L.L.P.

(57) ABSTRACT

A heat sink may comprise a core body having a phase change material cavity enclosed therein; and a phase change material disposed within the phase change material cavity comprising a paraffin wax and/or a fatty acid ester.

17 Claims, 4 Drawing Sheets

HEAT SINK PHASE CHANGE MATERIAL

FIELD

This disclosure generally relates to phase change materials, and more specifically, to phase change materials in heat sinks.

BACKGROUND

Heat sinks may be used to absorb and/or dissipate heat within a device, such as electronic devices, motors, engines, or the like. Heat sinks may comprise a phase change material, which may absorb heat during a phase change (e.g., from solid phase to liquid phase). However, the phase change of the phase change material may cause pressure within the heat sink, which may result in damage to the heat sink and/or the device.

SUMMARY

In various embodiments, a phase change material disposed within a heat sink may comprise a paraffin wax; and/or a fatty acid ester. In various embodiments, the fatty acid ester may comprise butyl stearate. In various embodiments, the paraffin wax may comprise tetradecane, pentadecane, and/or octadecane. In various embodiments, the fatty acid ester may make up between 0.5 and 15 percent by weight of the phase change material. In various embodiments, the fatty acid ester may make up between 1 and 5 percent by weight of the phase change material. In various embodiments, the fatty acid ester may make up about 2 percent by weight of the phase change material.

In various embodiments, a heat sink may comprise a core body comprising a phase change material cavity enclosed therein; and/or a phase change material disposed within the phase change material cavity comprising a paraffin wax and/or a fatty acid ester. In various embodiments, the fatty acid ester may comprise butyl stearate. In various embodiments, the paraffin wax may comprise tetradecane, pentadecane, and/or octadecane. In various embodiments, the fatty acid ester may make up between 0.5 and 15 percent by weight of the phase change material. In various embodiments, the fatty acid ester may make up between 1 and 5 percent by weight of the phase change material. In various embodiments, the fatty acid ester may make up about 2 percent by weight of the phase change material.

In various embodiments, a method may comprise preparing a phase change material, wherein the preparing comprises mixing a paraffin wax and a fatty acid ester; disposing the phase change material into a phase change material cavity in a heat sink; flowing coolant through the heat sink, wherein the coolant is in thermal communication with the phase change material; and/or causing the phase change material to undergo a phase change. In various embodiments, the fatty acid ester may comprise butyl stearate. In various embodiments, the paraffin wax may comprise at least one of tetradecane, pentadecane, and octadecane. In various embodiments, the phase change material resulting from preparing the phase change material may comprise between 1 and 10 percent by weight fatty acid ester and between 90 and 99 percent by weight paraffin wax.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. Elements with the like element numbering throughout the figures are intended to be the same.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
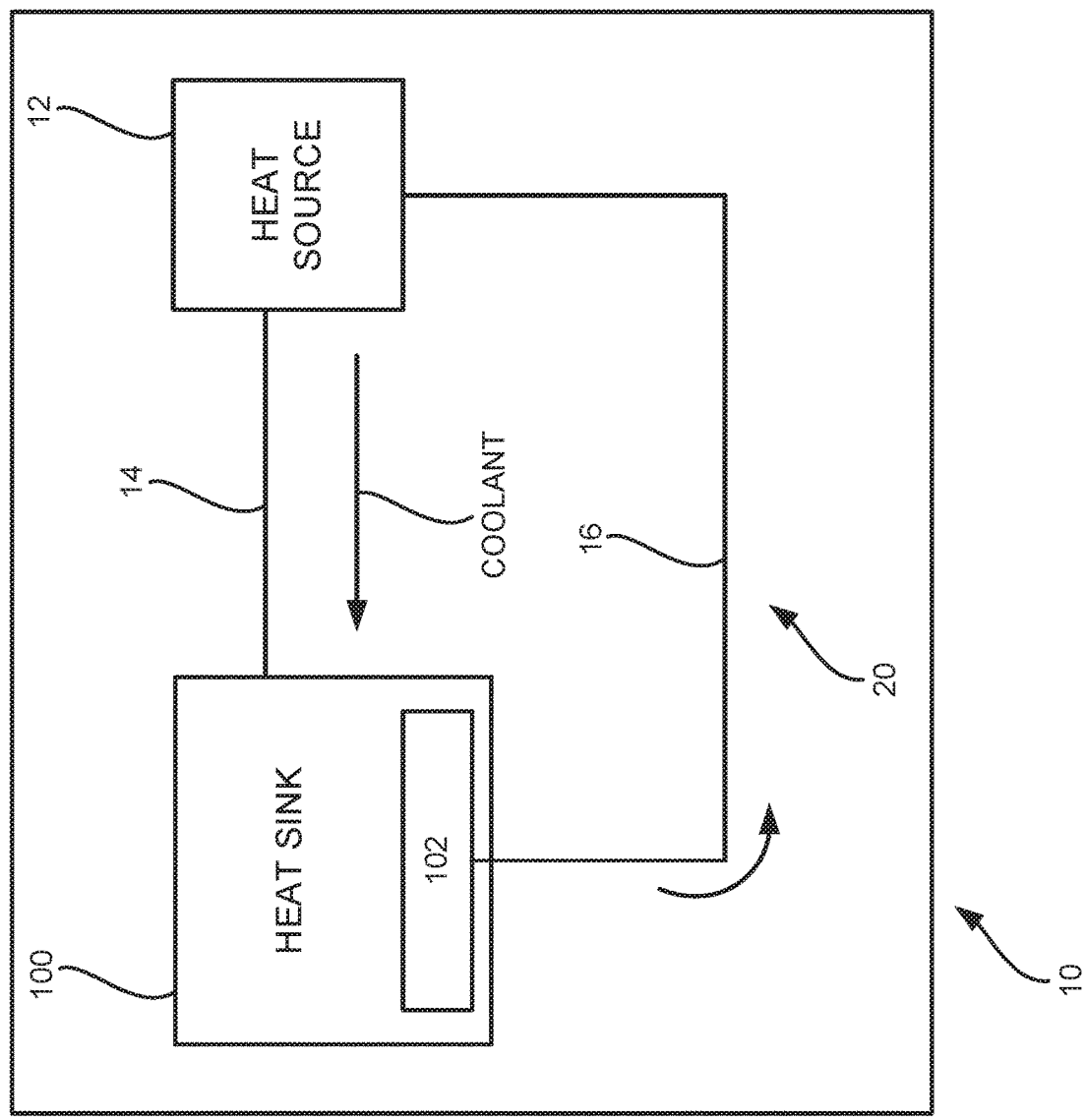
FIG. 1 illustrates a schematic diagram of a cooling system within a vehicle comprising a heat sink, in accordance with various embodiments.

With reference to FIG. 1, a schematic diagram of a cooling system 20 included in a vehicle 10 is depicted, in accordance with various embodiments. Vehicle 10 may be any suitable vehicle, such as a vehicle for operation in a microgravity environment, such as space. Cooling system 20, in various embodiments, may comprise a heat sink 100 including a core body 102. In various embodiments, core body 102 may comprise a phase change material (PCM) cavity, wherein a PCM may be disposed. In various embodiments, cooling system 20 comprises a supply conduit 14 for flowing coolant from heat source 12 to heat sink 100 and a return conduit 16 for returning coolant from heat sink 100 to heat source 12. Therefore, cooling system 20 couples heat sink 100 and a heat source 12 such that they are in fluid and/or thermal communication (i.e., heat may flow between heat sink 100 and heat source 12). Heat source 12 may be an electrical component associated with or comprised in vehicle 10, and cooling system 20 may be configured to deposit heat rejected from heat source 12 into heat sink 100 and/or return previously rejected heat from heat sink 100 to heat source 12 depending on the operating environs of vehicle 10, such as when vehicle 10 moves into and out of direct sunlight.

Figure 2:
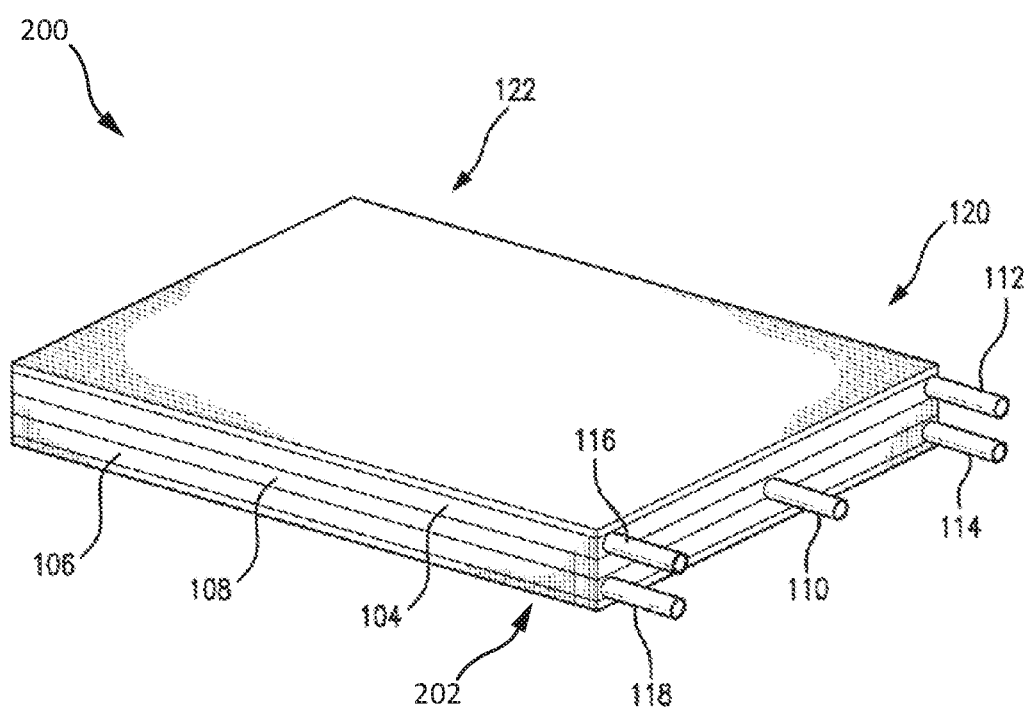
FIG. 2 illustrates a heat sink, in accordance with various embodiments.

With reference to FIG. 2, a heat sink 200 (an example of heat sink 100 in FIG. 1) may comprise a core body 202 (an example of core body 102 in FIG. 1). In various embodiments, core body 202 may comprise a first chamber 104, a second chamber 106, and/or a coolant plenum 108. First chamber 104 and second chamber 106 may be disposed on opposite sides of coolant plenum 108 such that coolant plenum 108 separates first chamber 104 from second chamber 106. Core body 202 may comprise a coolant outlet 110, a first coolant inlet 112, and/or a second coolant inlet 114. Coolant outlet 110 may be disposed on coolant plenum 108 and may be in fluid communication with an interior of coolant plenum 108. First coolant inlet 112 may be disposed on first chamber 104 and may be in fluid communication with coolant outlet 110. Second coolant inlet 114 may be disposed on second chamber 106 and may also be in fluid communication with coolant outlet 110.

In various embodiments, core body 202 may additionally comprise a third coolant inlet 116 and a fourth coolant inlet 118. Third coolant inlet 116 may be disposed on first chamber 104 and may be in fluid communication with coolant outlet 110. Fourth coolant inlet 118 may be disposed on second chamber 106 and may be in fluid communication with coolant outlet 110. Each of the coolant inlets and the coolant outlet may be disposed on a first end 120 of core body 202, first end 120 being opposite a second end 122 of core body 202, such that core body 202 provides an internal coolant flow path within core body 202. As will be appreciated, core body 202 may comprise any number of coolant chambers with inlets and coolant plenums with outlets, with the inlets and outlets disposed in any suitable arrangement, as appropriate for an intended application.

In various embodiments, a coolant may flow into heat sink 200 via first coolant inlet 112, second coolant inlet 114, third coolant inlet 116, and/or fourth coolant inlet 118, and exit heat sink 200 via coolant outlet 110. In various embodiments, coolant flowing through first coolant inlet 112 and/or third coolant inlet 116 may flow through a first coolant conduit in first chamber 104, flow through coolant plenum 108, and out of heat sink 200 through coolant outlet 110. Similarly, coolant flowing through second coolant inlet 114 and/or fourth coolant inlet 118 may flow through a second coolant conduit in second chamber 106, flow through coolant plenum 108, and out of heat sink 200 through coolant outlet 110.

Figure 3:
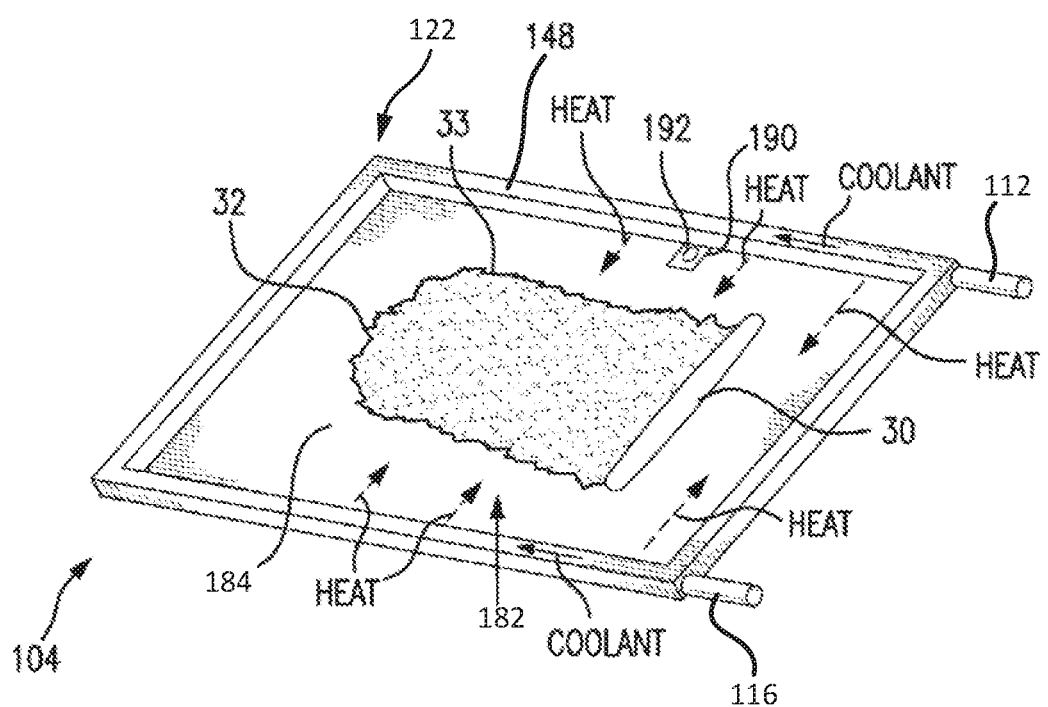
FIG. 3 illustrates a cross-sectional view of a heat sink comprising a phase change material, in accordance with various embodiments.

With reference to FIGS. 2 and 3, in various embodiments, heat sink 200 may comprise a PCM cavity 182 enclosed within core body 202. PCM cavity 182 may be comprised within first chamber 104, and may be surrounded and/or defined by a cavity wall 148. A coolant conduit may be comprised within cavity wall 148, such that the coolant may flow into the cavity wall 148 through first coolant inlet 112 and/or third coolant inlet 116. PCM cavity 182 may comprise a PCM 184 therein. PCM 184 may be configured to absorb and/or dissipate heat to which heat sink 200 is exposed. PCM 184 may absorb heat by undergoing a phase change (e.g., from a solid to a liquid), thereby absorbing and/or dissipating heat. In various embodiments, at least one ullage space 30 may be disposed within PCM cavity 182 and/or PCM 184 in any suitable location. Ullage space 30 may allow space within PCM cavity 182 into which PCM 184 may expand while undergoing a phase change. The space provided by ullage space 30 may mitigate pressure resulting from the phase change of PCM 184.

FIG. 3 depicts an example of heat flow within first chamber 104 and PCM cavity 182. A primary melt front 32 of PCM 184 may develop as a result of first chamber's 104 exposure to heat at second end 122 (i.e., PCM 184 proximate second end 122 may begin to melt). As coolant flows through the coolant conduits in cavity wall 148, a secondary melt front 33 may develop as heat transfers from the coolant and into PCM 184. Secondary melt front 33 may develop from thermal communication between the coolant conduit (and the coolant) within first chamber 104 and PCM 184, bridging ullage space 30 with primary melt front 32, thereby relieving pressure within PCM cavity 182.

In various embodiments, a heat sink may have more than one PCM cavity. For example, heat sink 200 may comprise a PCM cavity in second chamber 106 similar to PCM cavity 182 in first chamber 104. Therefore, a heat sink may have more than one area in which a PCM is disposed to absorb and/or dissipate heat.

In various embodiments, PCM 184 may comprise a paraffin wax and a fatty acid ester. In various embodiments, the paraffin wax may comprise any suitable material, including tetradecane, pentadecane, and/or octadecane. In various embodiments, the fatty acid ester may comprise any suitable material, including butyl stearate ($C_{22}H_{44}O_2$). In various embodiments, PCM 184 may comprise between 0.5 and 15 percent by weight fatty acid ester, and between 85 and 99.5 percent by weight paraffin wax. In various embodiments, PCM 184 may comprise between 1 and 10 percent by weight fatty acid ester, and between 90 and 99 percent by weight paraffin wax. In various embodiments, PCM 184 may comprise between 1 and 5 percent by weight fatty acid ester, and between 95 and 99 percent by weight paraffin wax. In various embodiments, PCM 184 may comprise about 2 percent by weight fatty acid ester, and about 98 percent by weight paraffin wax. In various embodiments, PCM 184 may comprise between 0.5 and 15 percent by weight fatty acid ester. In various embodiments, PCM 184 may comprise between 1 and 10 percent by weight fatty acid ester. In various embodiments, PCM 184 may comprise between 1 and 5 percent by weight fatty acid ester. In various embodiments, PCM 184 may comprise about 2 percent by weight fatty acid ester. In various embodiments, PCM 184 may comprise between 85 and 99.5 percent by weight paraffin wax. In various embodiments, PCM 184 may comprise between 90 and 99 percent by weight paraffin wax. In various embodiments, PCM 184 may comprise between 95 and 99 percent by weight paraffin wax. In various embodiments, PCM 184 may comprise about 98 percent by weight paraffin wax. As used in this context only, "about" means plus or minus 0.5 percent by weight.

In various embodiments, the presence of both the paraffin wax and the fatty acid ester in PCM 184 softens PCM 184 compared to a PCM 184 comprising a paraffin wax and no fatty acid ester. Therefore, PCM 184 comprising paraffin wax and fatty acid ester lessens the pressure created during a phase change of PCM 184 (e.g., by expansion of PCM 184), thus mitigating damage to PCM cavity 182 and/or heat sink 200 caused by such pressure. For example, PCM 184 having 5 percent by weight fatty acid ester (butyl stearate) and 95 percent by weight paraffin wax (octadecane) decreased the pressure within PCM cavity 182 between 45% and 55% percent relative to PCM 184 having paraffin wax and no fatty acid ester.

In various embodiments, heat sink 200 may comprise an open-celled body 190 within PCM cavity 182, which may improve heat transfer. Open-celled body 190 may be coupled to cavity wall 148, or another component of heat sink 200. Open celled body 190 may comprise a cell 192 within which PCM 184 is disposed. In various embodiments, the portions of open-celled body 190 surrounding the PCM 184 in cell 192 may be formed from a thermally conductive wire, mesh, fins, or foam-like structure, thereby providing a thermal conduit into PCM 184 within cell 192. This may facilitate formation of fissures within the PCM 184 through which liquid material may migrate, for example from regions of relatively high pressure adjacent to melt front 32, to regions of low pressure (e.g., ullage space 30).

Figure 4:
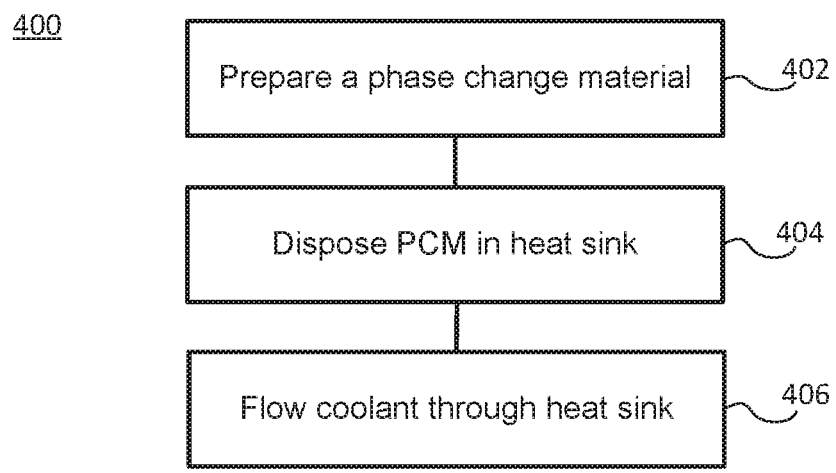
FIG. 4 illustrates a block diagram of a method of dissipating heat through a heat sink, in accordance with various embodiments.

With reference to FIGS. 2-4, a method 400 for dissipating heat through heat sink 200 is depicted, in accordance with various embodiments. Method 400 may comprise preparing PCM 184 (step 402). Preparing PCM 184 may comprise mixing paraffin wax and a fatty acid ester in any of the weight percentages described herein. In various embodiments, the paraffin wax may be in liquid form during preparation of the PCM 184. PCM 184, in response to being prepared, may be disposed into heat sink 200 (step 404). PCM 184 may be poured or injected, for example, into a PCM cavity 184 within heat sink 200. In various embodiments, PCM 184 may be in liquid form when disposed in heat sink 200, and allowed to dry (e.g., solidify) in response to being disposed in heat sink 200. In various embodiments, PCM 184 may be disposed in heat sink 200 in solid form.

In various embodiments, during operation, a coolant may flow through heat sink 200 (step 406). For example, coolant may flow into heat sink 200 through first coolant inlet 112 and/or third coolant inlet 116, and through the coolant conduit within cavity wall 148. By so doing, heat from coolant may be absorbed and/or dissipated by PCM 184, causing PCM 184 to undergo a phase change. PCM 184, in response, may become a liquid, and expand into within PCM cavity 182 including into a ullage space 30 disposed within PCM cavity 182. The composition of PCM 184, as described herein, may alleviate pressure caused by the phase change of PCM 184, along with the presence of ullage space 30.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A phase change material disposed within a heat sink, comprising:
    a paraffin wax; and
    a fatty acid ester,
    wherein the phase change material comprises between 1 and 10 percent by weight the fatty acid ester and between 90 and 99 percent by weight the paraffin wax.

2. The phase change material of claim 1, wherein the fatty acid ester comprises butyl stearate.

3. The phase change material of claim 2, wherein the paraffin wax comprises tetradecane.

4. The phase change material of claim 2, wherein the paraffin wax comprises pentadecane.

5. The phase change material of claim 2, wherein the paraffin wax comprises octadecane.

6. The phase change material of claim 1, wherein the fatty acid ester makes up between 1 and 5 percent by weight of the phase change material.

7. The phase change material of claim 1, wherein the fatty acid ester makes up about 2 percent by weight of the phase change material.

8. A heat sink, comprising:
    a core body comprising a phase change material cavity enclosed therein; and
    a phase change material disposed within the phase change material cavity comprising a paraffin wax and a fatty acid ester, wherein the phase change material comprises between 1 and 10 percent by weight the fatty acid ester and between 90 and 99 percent by weight the paraffin wax.

9. The heat sink of claim 8, wherein the fatty acid ester comprises butyl stearate.

10. The heat sink of claim 9, wherein the paraffin wax comprises tetradecane.

11. The heat sink of claim 9, wherein the paraffin wax comprises pentadecane.

12. The heat sink of claim 9, wherein the paraffin wax is octadecane.

13. The heat sink of claim 8, wherein the fatty acid ester makes up between 1 and 5 percent by weight of the phase change material.

14. The heat sink of claim 8, wherein the fatty acid ester makes up about 2 percent by weight of the phase change material.

15. A method, comprising:
preparing a phase change material, wherein the preparing comprises mixing a paraffin wax and a fatty acid ester, wherein the phase change material comprises between 1 and 10 percent by weight the fatty acid ester and between 90 and 99 percent by weight the paraffin wax;
disposing the phase change material into a phase change material cavity in a heat sink;
flowing coolant through the heat sink, wherein the coolant is in thermal communication with the phase change material; and
causing the phase change material to undergo a phase change.

16. The method of claim 15, wherein the fatty acid ester comprises butyl stearate.

17. The method of claim 15, wherein the paraffin wax comprises at least one of tetradecane, pentadecane, and octadecane.

\* \* \* \* \*